US005304267A

United States Patent [19]

Vrotacoe et al.

[11] Patent Number: 5,304,267

[45] Date of Patent: Apr. 19, 1994

[54] METHOD OF MAKING A GAPLESS TUBULAR PRINTING BLANKET

[75] Inventors: James B. Vrotacoe, Dover; Glenn A. Guaraldi, Kingston, both of N.H.; James R. Carlson, Racine; Gregory T. Squires, Union Grove, both of Wis.

[73] Assignee: Heidelberg Harris GmbH, Kurfursten-Anlage, Fed. Rep. of Germany

[21] Appl. No.: 10,068

[22] Filed: Jan. 27, 1993

Related U.S. Application Data

[62] Division of Ser. No. 699,668, May 14, 1991.

[51] Int. Cl.⁵ ........ B32B 31/00

[52] U.S. Cl. ........ 156/86; 156/161; 156/165; 156/170; 156/172; 264/137; 264/255; 264/258

[58] Field of Search ........ 264/162, 262, 309, 135, 264/137, 255, 257, 258, DIG. 6; 156/86, 154, 161, 165, 172, 294, 170

[56] References Cited

U.S. PATENT DOCUMENTS

| | | | |
|---|---|---|---|
| 1,208,879 | 12/1916 | Wood | 264/262 |
| 1,537,439 | 5/1925 | Griffith | 492/38 |
| 1,659,371 | 2/1928 | Merrill | 264/260 |
| 1,691,336 | 11/1928 | Casto | 101/475 |
| 1,804,139 | 5/1931 | Adsit et al. | 101/217 |
| 2,185,738 | 1/1940 | Rockoff | 264/162 |
| 2,315,729 | 4/1943 | Nunnally | 242/72.1 |
| 2,342,556 | 2/1944 | Rockoff | 264/162 |
| 3,146,709 | 9/1964 | Bass et al. | 29/450 |
| 3,152,387 | 10/1964 | MacLeod | 492/56 |
| 3,467,009 | 9/1969 | Ross | 101/216 |
| 3,625,376 | 3/1972 | Bowden, III | 414/789.8 |
| 3,673,023 | 6/1972 | Ross | 156/176 |
| 3,700,541 | 10/1972 | Shrimpton et al. | 428/313.5 |
| 3,733,233 | 5/1973 | Griffith | 264/162 |
| 4,042,743 | 8/1977 | Larson et al. | 428/313.5 |
| 4,093,764 | 6/1978 | Duckett et al. | 428/300 |
| 4,198,739 | 4/1980 | Budinger et al. | 156/86 |
| 4,634,484 | 1/1987 | Wagner | 264/162 |
| 4,662,045 | 5/1987 | Grödum | 156/86 |
| 4,770,928 | 9/1988 | Gaworowski et al. | 101/401.1 |
| 4,812,185 | 3/1989 | Romanski | 156/86 |
| 4,812,357 | 3/1989 | O'Rell et al. | 428/246 |
| 4,823,693 | 4/1989 | Kobler | 29/446 |
| 4,913,048 | 4/1990 | Tittgemeyer | 101/216 |

FOREIGN PATENT DOCUMENTS

| | | | |
|---|---|---|---|
| 0076777 | 9/1982 | European Pat. Off. . | |
| 0452184A1 | 10/1991 | European Pat. Off. . | |
| 564221 | 11/1932 | Fed. Rep. of Germany . | |
| 54-107969 | 8/1979 | Japan | 264/262 |
| 1198863 | 7/1970 | United Kingdom . | |
| 1400932 | 7/1975 | United Kingdom . | |
| 2016373A | 9/1979 | United Kingdom . | |
| 2024104A | 1/1980 | United Kingdom . | |

*Primary Examiner*—Jay H. Woo
*Assistant Examiner*—Robert B. Davis
*Attorney, Agent, or Firm*—Kenyon & Kenyon

[57] ABSTRACT

A tubular printing blanket for a blanket cylinder in an offset printing press includes a cylindrical sleeve, a compressible layer over the sleeve, and an inextensible layer over the compressible layer. The cylindrical sleeve is movable telescopically over a blanket cylinder. The compressible layer includes a first seamless tubular body of elastomeric material containing compressible microspheres. The inextensible layer includes a second seamless tubular body of elastomeric material containing a tubular sublayer of circumferentially inextensible material. A seamless tubular printing layer over the inextensible layer has a continuous, gapless cylindrical printing surface. Methods of manufacturing the tubular printing blanket are also disclosed.

11 Claims, 7 Drawing Sheets

FIG. 9A
FIG. 9B
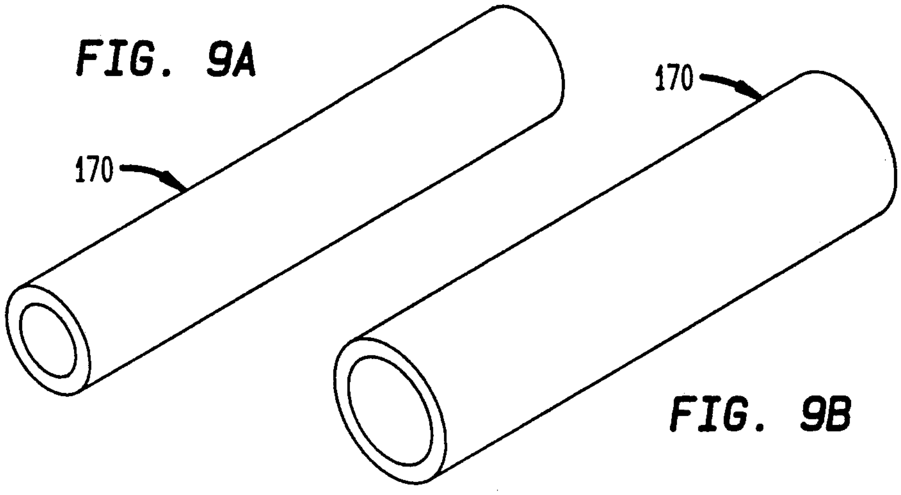
FIG. 10
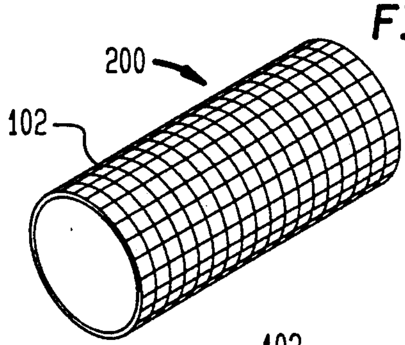
FIG. 11A
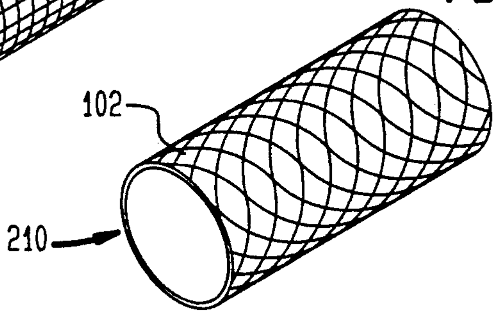
FIG. 11B
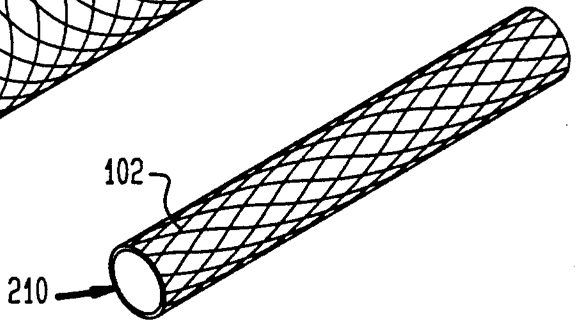
FIG. 12
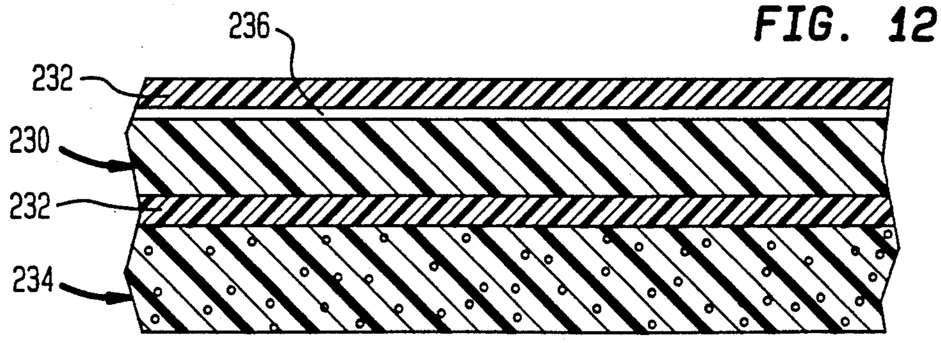

METHOD OF MAKING A GAPLESS TUBULAR PRINTING BLANKET

This is a divisional of copending application(s) Ser. No. 07/699,668 filed on May 14, 1991.

FIELD OF THE INVENTION

The present invention relates to printing blankets for blanket cylinders in web offset printing presses, and particularly relates to a gapless tubular printing blanket.

BACKGROUND OF THE INVENTION

A web offset printing press typically includes a plate cylinder, a blanket cylinder and an impression cylinder supported for rotation in the press. The plate cylinder carries a printing plate having a rigid surface defining an image to be printed. The blanket cylinder carries a printing blanket having a flexible surface which contacts the printing plate at a nip between the plate cylinder and the blanket cylinder. A web to be printed moves through a nip between the blanket cylinder and the impression cylinder. Ink is applied to the surface of the printing plate on the plate cylinder. An inked image is picked up by the printing blanket at the nip between the blanket cylinder and the plate cylinder, and is transferred from the printing blanket to the web at the nip between the blanket cylinder and the impression cylinder. The impression cylinder can be another blanket cylinder for printing on the opposite side of the web.

A conventional printing blanket is manufactured as a flat sheet. Such a printing blanket is mounted on a blanket cylinder by wrapping the sheet around the blanket cylinder and by attaching the opposite ends of the sheet to the blanket cylinder in an axially extending gap in the blanket cylinder. The adjoining opposite ends of the sheet define a gap extending axially along the length of the printing blanket. The gap moves through the nip between the blanket cylinder and the plate cylinder, and also moves through the nip between the blanket cylinder and the impression cylinder, each lime the blanket cylinder rotates.

When the leading and trailing edges of the gap at the printing blanket move through the nip between the blanket cylinder and an adjacent cylinder, pressure between the blanket cylinder and the adjacent cylinder is relieved and established, respectively. The repeated relieving and establishing of pressure at the gap causes vibrations and shock loads in the cylinders and throughout the printing press. Such vibrations and shock loads detrimentally affect print quality. For example, at the time that the gap relieves and establishes pressure at the nip between the blanket cylinder and the plate cylinder, printing may be taking place on the web moving through the nip between blanket cylinder and the impression cylinder. Any movement of the blanket cylinder or the printing blanket caused by the relieving and establishing of pressure at that time can smear the image which is transferred from the printing blanket to the web. Likewise, when the gap in the printing blanket moves through the nip between the blanket cylinder and the impression cylinder, an image being picked up from the printing plate by the printing blanket at the other nip can be smeared. The result of the vibrations and shock loads caused by the gap in the printing blanket has been an undesirably low limit to the speed at which printing presses can be run with acceptable print quality.

Another problem caused by the gap at the adjoining ends of a conventional printing blanket is the circumferentially extending void defined by the width of the gap. The void defined by the width of the gap interrupts and reduces the circumferential length of the printing surface on the blanket cylinder. This causes an area of the web to remain unprinted each time the blanket cylinder rotates. Such unprinted areas of the web reduce productivity and increase waste. In addition, such a conventional printing blanket is not easily properly attached to a blanket cylinder. As a result there can be considerable press downtime, which can be expensive. Furthermore, the blanket cylinder itself must be equipped with means for engaging the opposite ends of the printing blanket to hold them in place.

Another problem associated with conventional printing blankets is caused by the pressure exerted against the flexible surface of the printing blanket by the rigid surface of the printing plate at the nip between the blanket cylinder and the plate cylinder. The flexible surface of the printing blanket is indented by the rigid surface of the printing plate as it is pressed against the printing plate upon movement through the nip. At the center of the nip, the cylindrical contour of the rigid printing plate impresses a corresponding cylindrical depression in the flexible printing blanket. When a depression is pressed into the flexible printing blanket, bulges tend to arise on each of the two opposite sides of the depression. Such bulges appear as standing waves on the surface of the printing blanket on opposite circumferential sides of the nip. A point on the surface of the printing blanket moves up and over such standing waves as it enters and exits the nip. Compared with a point on the rigid cylindrical surface of the printing plate, a point on the flexible surface of the printing blanket traverses a greater distance as it moves past the nip. The speeds of those surfaces therefore differ at the nip. A difference in surface speeds causes slipping between the surfaces which can smear the ink transferred from one surface to the other.

Printing blankets are known to include compressible rubber materials which compress under the pressure exerted against the printing blanket by the printing plate at the nip therebetween. Compression of the printing blanket at the nip reduces the tendency of bulges to form at opposite sides of the nip. Standing waves which could smear the ink on the rotating printing blanket are thus reduced, but repeated compression and expansion of the compressible rubber material can cause the printing blanket to overheat.

SUMMARY OF THE INVENTION

The present invention provides a tubular printing blanket which enables a printing press to run at high speeds without excessive vibration or shock loads, without slipping of printing surfaces which could smear the ink, and without overheating.

In accordance with the present invention, a tubular printing blanket for a blanket cylinder in an offset printing press comprises a cylindrical sleeve movable axially over a blanket cylinder, a compressible layer over the sleeve, and an inextensible layer over the compressible layer. The compressible layer comprises a first seamless tubular body of elastomeric material containing compressible microspheres. The inextensible layer comprises a second seamless tubular body of elastomeric material containing a tubular sublayer of circumferentially inextensible material. The tubular printing blanket further comprises a seamless tubular printing layer having a continuous, gapless cylindrical printing surface The tubular printing blanket in accordance with the invention advantageously has a seamless and gapless tubular form throughout its various layers, including a continuous, gapless cylindrical printing surface. When the tubular printing blanket moves through the nip between a blanket cylinder and a plate cylinder, the cross-sectional shape of the tubular printing blanket at the nip remains constant. The pressure relationship between the tubular printing blanket and the printing plate thus remains constant while the printing press is running, and movement of the tubular printing blanket through the nip does not cause vibrations or shock loads. Furthermore, because there is no gap at the surface of the tubular printing blanket, there is less waste and greater productivity.

Additionally, the inextensible layer of the tubular printing blanket prevents the formation of standing waves on the outer printing surface which could smear the inked image.

In a preferred embodiment of the present invention, the compressible layer of the tubular printing blanket includes a compressible fabric material along with the compressible microspheres. The compressible fabric material is included as a thread wound helically through the compressible layer and around the underlying cylindrical sleeve. The thread heats up less than the surrounding elastomeric material during use of the tubular printing blanket, and thus enables the tubular printing blanket to run cooler.

In a preferred method of manufacturing the tubular printing blanket, the compressible layer is formed by coating a compressible thread with a mixture of rubber cement and microspheres, and wrapping the coated thread in a helix around the cylindrical sleeve. The inextensible layer is similarly formed by coating an inextensible thread with a rubber cement that does not contain microspheres, and wrapping the coated thread in a helix around the underlying compressible layer. The inextensible thread thus defines a circumferentially inextensible tubular sublayer which imparts inextensibility to the inextensible layer. The printing layer is formed over the inextensible layer by wrapping an unvulcanized elastomer over the inextensible layer and securing it with tape. The taped structure is vulcanized so that a continuous seamless tubular form is taken by the overlying layers of elastomeric material.

BRIEF DESCRIPTION OF THE DRAWINGS

The foregoing and other features of the present invention will become apparent to those skilled in the art upon reading the following description of preferred embodiments of the invention in view of the accompanying drawings, wherein:

FIGS. 9A and 9B are schematic views of a part of a tubular printing blanket in accordance with another alternate embodiment of the present invention;

FIG. 10 is a schematic view of a part of a tubular printing blanket in accordance with another alternate embodiment of the present invention;

FIGS. 11A and 11B are schematic views of a part of a tubular printing blanket in accordance with yet another alternate embodiment of the present invention;

FIG. 12 is a partial sectional view of a tubular printing blanket in accordance with an additional alternate embodiment of the present invention.

DESCRIPTION OF PREFERRED EMBODIMENTS

Figure 1:
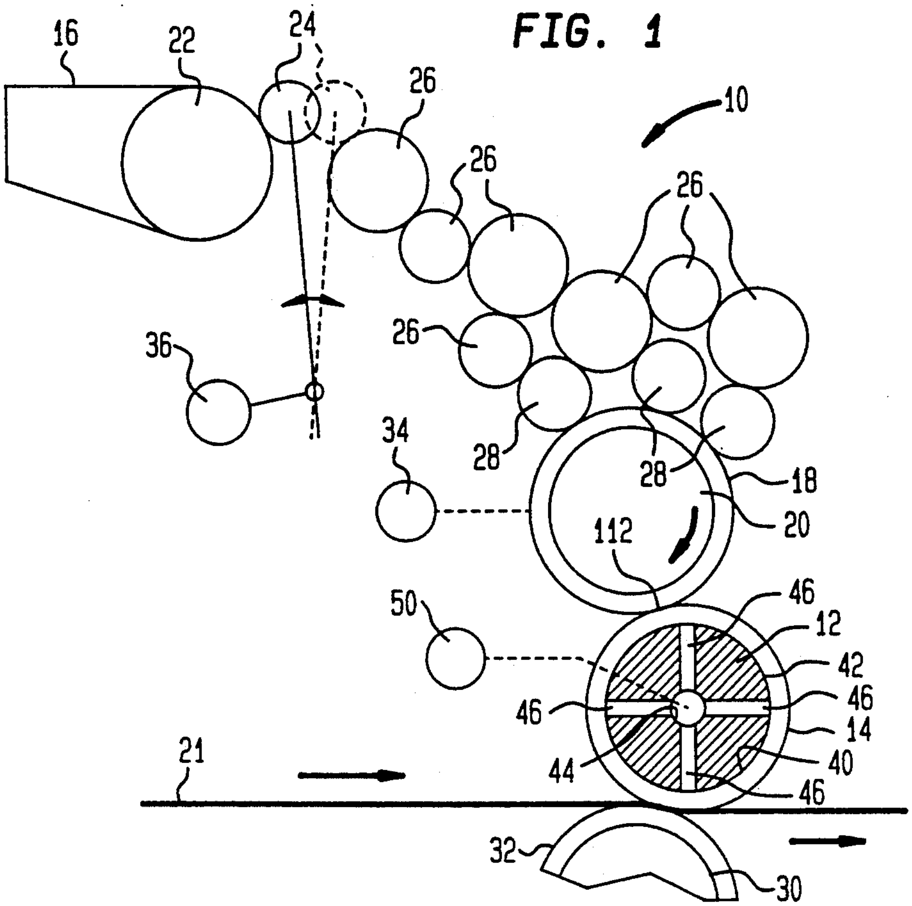
FIG. 1 is a schematic view of a printing apparatus including a tubular printing blanket in accordance with the present invention.
Figure 2:
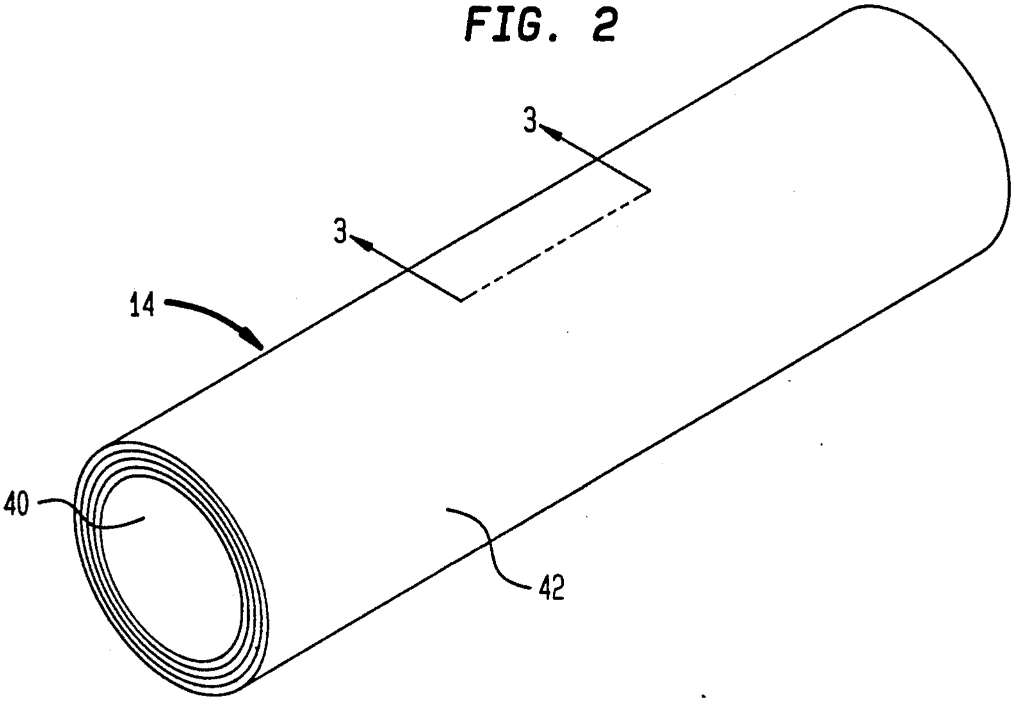
FIG. 2 is a schematic perspective view of the printing blanket shown in FIG. 1.

As shown schematically in FIG. 1, a printing apparatus 10 includes a blanket cylinder 12 with a tubular printing blanket 14 constructed in accordance with the present invention. The printing apparatus 10, by way of example, is an offset printing press comprising a plurality of rolls for transferring ink from an ink fountain 16 to a printing plate 18 on a plate cylinder 20. The tubular printing blanket 14 on the blanket cylinder 12 transfers the inked image from the printing plate 18 to a moving web 21.

A fountain roll 22 picks up ink from the ink fountain 16. A ductor roll 24 is reciprocated between the fountain roll 22 and a first distributor roll 26 in order to transfer ink from the fountain roll 22 to the first distributor roll 26, as indicated in FIG. 1. A plurality of successive distributor rolls 26 transfers ink from the first distributor roll 26 to a group of form rolls 28, which, in turn, transfers the ink to the printing plate 18 the plate cylinder 20. A second blanket cylinder 30 with a second tubular printing blanket 32 is shown only partially in FIG. 1 to represent a second printing apparatus for printing simultaneously on the opposite side of the web 21. The blanket cylinders 14 and 30 serve as impression cylinders for each other. The rolls and cylinders are interconnected by gears and are rotated by a drive means 34 in a known manner The ductor roll 24 is moved by a reciprocating mechanism 36 in a known manner.

The tubular printing blanket 14 has a continuous, gapless inner cylindrical surface 40 firmly engaged in frictional contact with the cylindrical outer surface 42 of the blanket cylinder 12. The blanket cylinder 12 has a central lumen 44 and a plurality of passages 46 extending radially from the central lumen 44 to the cylindrical outer surface 42. A source 50 of pressurized gas communicates with the central lumen 44 in the blanket cylinder 12, and is operable to provide a flow of pressurized gas which is directed against the inner cylindrical surface 40 of the tubular printing blanket 14 from the central lumen 44 and the radially extending passages 46.

When a flow of pressurized gas is directed against the cylindrical inner surface 40 of the tubular printing blanket 14, the cylindrical inner surface 40 is elastically deformed in a slight amount to increase the diameter thereof The tubular printing blanket 14 is then easily moved telescopically on or off the blanket cylinder 12. When the flow of pressurized gas is stopped, the inner cylindrical surface 40 of the tubular printing blanket 14 elastically contracts to its original size to grip the outer surface 42 of the blanket cylinder 12. The tubular printing blanket 14 is then firmly engaged in frictional contact with the blanket cylinder 12 and will not move relative to the blanket cylinder 12 during operation of the printing apparatus 10.

Figure 3:
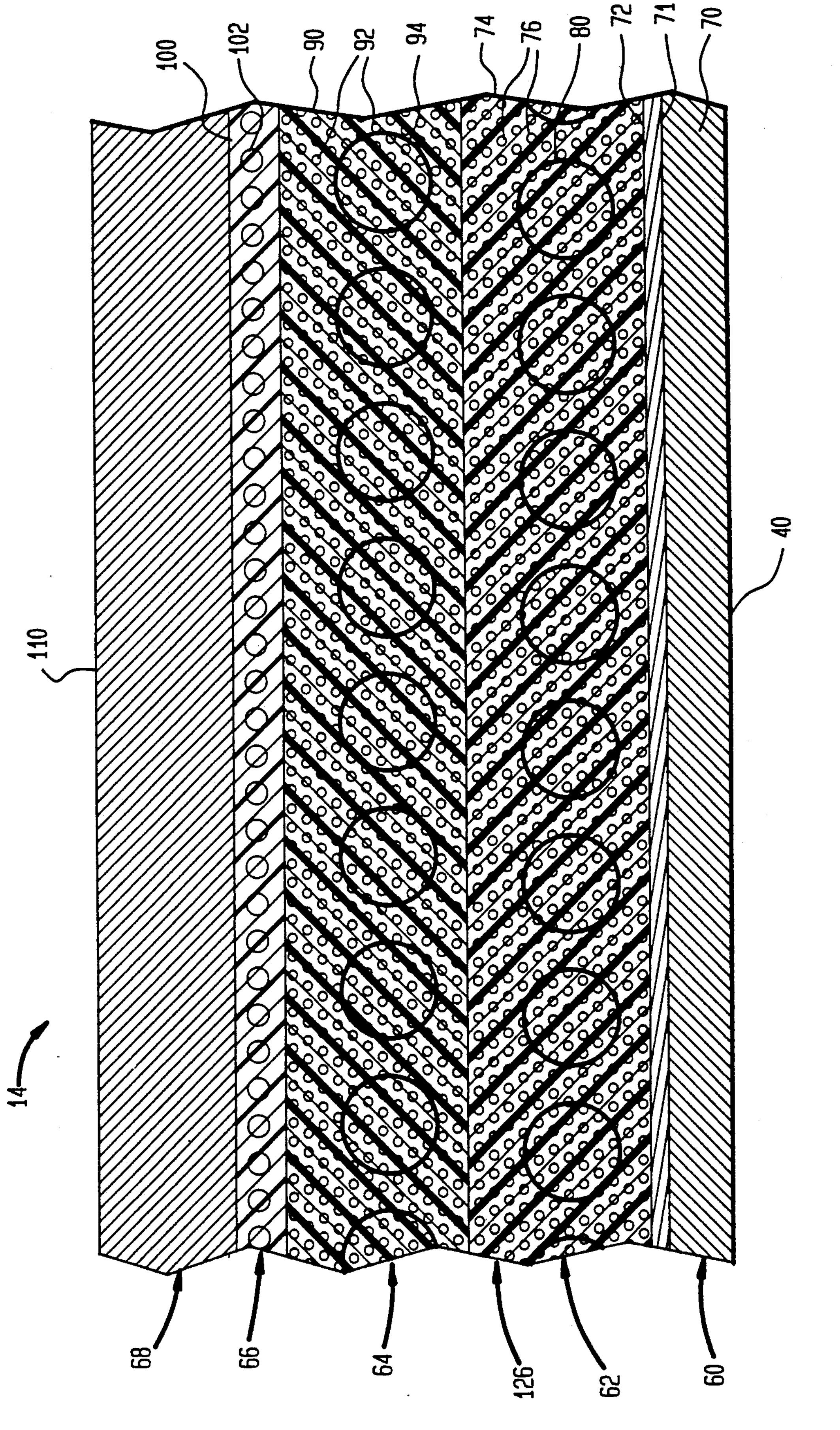
FIG. 3 is a sectional view taken on line 3—3 of FIG. 2.

As shown in FIG. 3, the tubular printing blanket 14 comprises a plurality of layers. The layers include a relatively rigid backing layer 60 and a number of flexible layers supported on the backing layer 60. The flexible layers include first and second compressible layers 62 and 64, an inextensible layer 66, and a printing layer 68.

The backing layer 60 is defined by a cylindrical sleeve 70 on which the inner cylindrical surface 40 is located. The cylindrical sleeve 70 is elastically expandable radially in a slight amount to assist telescopic movement of the tubular printing blanket 14 over the blanket cylinder 12, as described above. The cylindrical sleeve 70 is preferably formed of metal, such as nickel with a thickness of approximately 0.005 inches, which has been found to have the requisite rigidity, strength and elastic properties. Alternately, the cylindrical sleeve 70 can be formed of a polymeric material such as fiberglass or plastic, e.g. MYLAR (TM) plastic material, having a thickness of approximately 0.030 inches.

Two coats of primer 71 and 72 help to bind the first compressible layer 62 to the backing layer 60. If the backing layer 60 is a nickel cylinder, the primer coat 71 is preferably Chemlok 205, and the primer coat 72 is preferably Chemlok 220, both available from Lord Chemical.

The first compressible layer 62, as shown in FIG. 3, comprises a seamless tubular body 74 of elastomeric material and a plurality of compressible microspheres 76 encapsulated in the tubular body 74. The first compressible layer 62 further comprises a compressible thread 80 extending helically through the tubular body 74 and around the backing layer 60. The thread 80 is impregnated with the elastomeric material of the tubular body 74 and with the microspheres 76. The second compressible layer 64 similarly comprises a seamless tubular body 90 of elastomeric material, a plurality of compressible microspheres 92 encapsulated in the tubular body 90, and a compressible thread 94 extending helically through the tubular body 90 and around the first compressible layer 62.

The elastomeric material of which the seamless tubular bodies 74 and 90 are formed is preferably mixed with the microspheres 76 to form a compressible, composite rubber cement having the following composition:

| | PARTS |
|---|---|
| 1. Copolymer of Butadiene and Acrylonitrile with 50 parts DOP | 480.00 |
| 2. Soft sulfur FACTICE (TM) | 40.00 |
| 3. Acrylonitrile/Butadiene copolymer | 80.00 |
| 4. Medium thermal carbon black | 360.00 |
| 5. Barium Sulfate | 80.00 |
| 6. Dioctyl Phthalate | 40.00 |
| 7. Benzothiazyl Disulfide accelerator | 8.00 |
| 8. Tetramethyl-Thiuram Disulfide accelerator | 4.00 |
| 9. Sulfur with magnesium carbonate | 4.00 |
| 10. Zinc Oxide activator | 20.00 |
| 11. Butyl Eight 2% by weight of adding lines 1 thru 10 | |
| 12. Microspheres 6% by weight of adding lines 1 thru 11 | |
| 13. Toluene 2.5 times weight of adding lines 1 thru 12 | |

The microspheres 76 and 92 are preferably those known by the trademark EXPANCEL 461 DE from Expancel of Sundsvall, Sweden. Such microspheres have a shell consisting basically of a copolymer of vinylidene chloride and acrylonitrile, and contain gaseous isobutane. Other microspheres possessing the desired properties of compressibility can also be employed, such as those disclosed in U.S. Pat. No. 4,770,928.

The compressible threads 80 and 94 are preferably cotton threads having diameters of approximately 0.005 to 0.030 inches, and most preferably having diameters of approximately 0.015 inches. The individual windings of thread, i.e. adjacent circumferential sections thereof, are preferably spaced axially from each other a distance of approximately 0.01 inches. Such close spacing assures that there are no substantial gaps between adjacent windings. Alternately, the threads 80 and 94 can be of other compressible materials, or can be replaced with compressible tubes.

The inextensible layer 66 comprises a seamless tubular body 100 of elastomeric material and a longitudinally inextensible thread 102 within the tubular body 100. The thread 102 extends helically through the tubular body 100 and around the second compressible layer 64. The thread 102 is preferably cotton with a diameter of approximately 0.007 inches, and with adjacent windings thereof spaced apart a distance of approximately 0.001 inches. The thread 102 thus extends in a tight helix in which adjacent windings extend in directions substantially perpendicular to the longitudinal axis of the tubular printing blanket 14.

The thread 102 in the longitudinal direction has a modulus of elasticity of not less than 100,000 lbs. per square inch, and in the preferred embodiment has a modulus of elasticity of about 840,000 lbs. per square inch. The elastomeric material of the seamless tubular body 100 has a modulus of elasticity of about 540 lbs. per square inch. The thread 102 thus has a modulus of elasticity of not less than about 185 times the modulus of elasticity of the elastomeric material of which the seamless tubular body 100 is formed, and preferably has a modulus of elasticity of about 1,555 times the modulus of elasticity of the elastomeric material. The helix of thread 102 thus defines a circumferentially inextensible tubular sublayer which contrains the tubular body 100 from extending circumferentially. As with the threads 80 and 94, the thread 102 is impregnated with the elastomeric material of the tubular body 100.

Alternately, the inextensible layer 66 could be formed of a seamless tubular body of rubber or urethane copolymer material having a modulus of elasticity in the range of 1,000–6,000 lbs. per square inch, and not including a sublayer of the thread 102. Such materials are available under the trademark AIRTHANE from Air Products and Chemicals, Inc.

Figure 4:
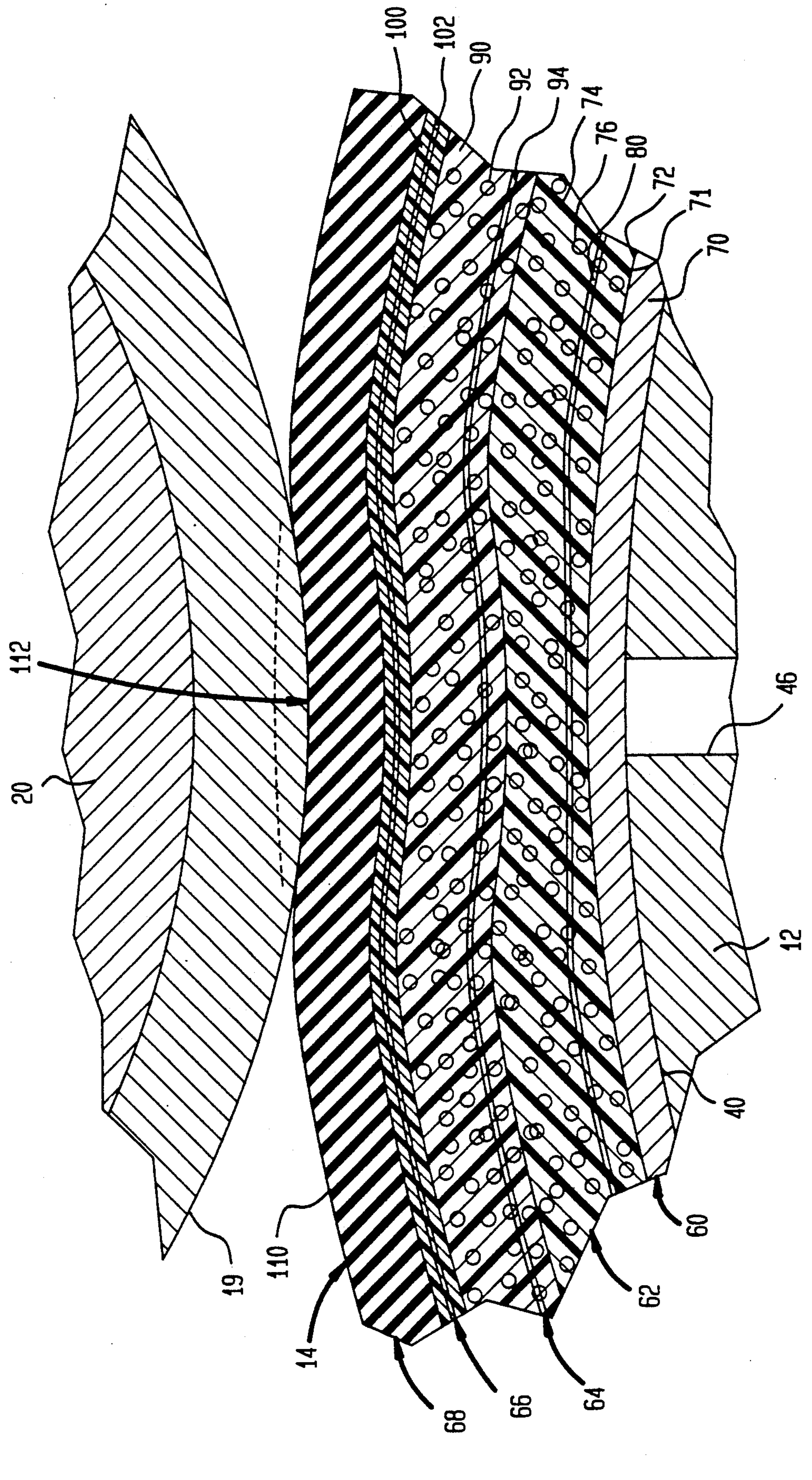
FIG. 4 is an enlarged sectional view of a portion of the printing apparatus of FIG. 1.

The printing layer 68 is a seamless and gapless tubular body having a smooth and gapless cylindrical outer printing surface 110. It is formed of a relatively soft elastomeric material, such as rubber, which yields slightly to become indented under the pressure applied to the tubular printing blanket 14 at the nip 112 between the blanket cylinder 12 and the plate cylinder 20 (FIGS. 1 and 4). Since the printing layer 68 is elastically yieldable, it helps to maintain a uniform pressure at the nip 112 to assure an even transfer of the inked image. The printing layer 68 preferably has the following composition:

| | PARTS |
|---|---|
| 1. Polysulfide polymer | 20.00 |
| 2. Acrylonitrile/Butadiene copolymer | 120.00 |
| 3. Vulcanized vegetable oil | 10.00 |
| 4. Medium thermal carbon black | 90.00 |
| 5. Barium Sulfate | 20.00 |
| 6. Polyester glutarate | 10.00 |
| 7. Proprietary curative in nitrile polymer | 15.90 |
| 8. Benzothiazyl Disulfide accelerator | 2.00 |
| 9. Tetramethyl-Thiuram Disulfide accelerator | 1.00 |
| 10. 75% Ethylene Thiourea/25% EPR binder accelerator | 0.20 |

Figure 5:
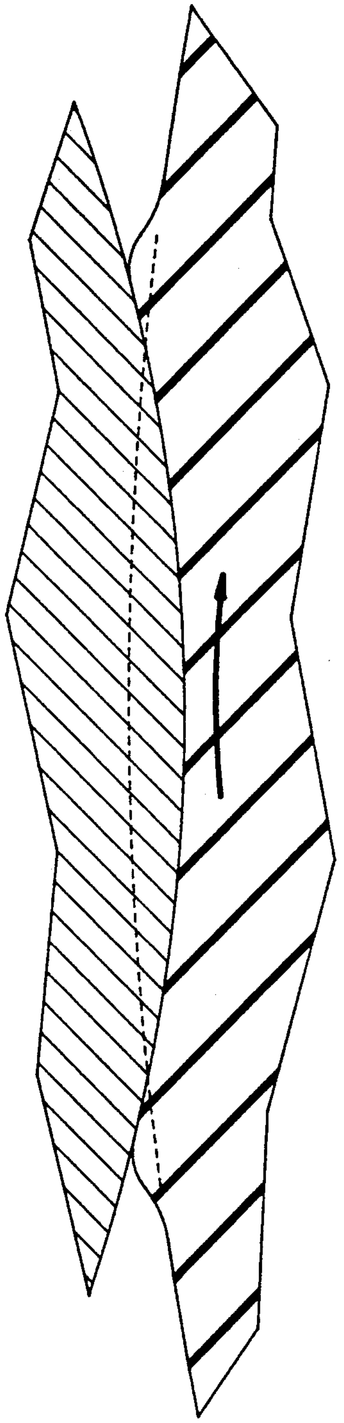
FIG. 5 (PRIOR ART)
FIG. 5 is a view of the prior art.

In operation of the printing apparatus 10, the cylindrical outer printing surface 110 on the tubular printing blanket 14 moves through the nip 112 between the plate cylinder 20 and the blanket cylinder 12, as shown in FIG. 4. The flexible layers 62–68 of the tubular printing blanket 14 are indented by the rigid surface of the printing plate 18 at the nip 112. The printing layer 68 is incompressible, and thus retains its original thickness as it moves through the nip 112. The inextensible layer 66 is slightly compressible due to the compressibility of the thread 102, and thus becomes slightly compressed as it moves through the nip 112. Importantly, the thread 102 is longitudinally inextensible, and restrains the inextensible layer 66 from bulging radially outward as it enters and exits the nip 112. The inextensible layer 66 prevents the portion of the printing layer in the printing nip from stretching in a circumferential direction more than 0.001 inches, and in fact in the preferred embodiment the portion of the printing layer in the printing nip stretches substantially less than 0.001 inches. The inextensible layer 66 also thoroughly prevents the formation of standing waves in the printing layer 68 on opposite sides of the nip (see prior art FIG. 5). Such standing waves lead to smearing of the ink.

The first and second compressible layers 62 and 64 are both compressed at the nip 112. It is known that compressible portions of a printing blanket become heated when repeatedly compressed and expanded during use. In the compressible layers 62 and 64, the cotton material of the compressible threads 80 and 94 has a lesser tendency to become heated than does the elastomeric material of the tubular bodies 74 and 90. The tubular printing blanket 14 in accordance with the invention thus has a low tendency to become overheated in use because the compressible layers 62 and 64 are at least partially formed of a material that runs cooler than the elastomeric material.

The printing layer 68 and the elastomeric bodies 74, 90 and 100 of the layers 62–66 beneath the printing layer 68 are continuous and seamless tubular bodies with no gaps or seams. Moreover, the helically wound threads 80, 94 and 102 do not define seams or gaps extending axially along the length of the tubular printing blanket 14. The cross-sectional shape of the tubular printing blanket 14 moving through the nip 112 therefore remains constant throughout each complete rotation of the blanket cylinder 12. The pressure relationship between the outer printing surface 110 and the printing plate 18 likewise remains constant throughout movement of the outer printing surface 110 past the nip 112. Shocks and vibrations experienced with known printing blankets having axially extending gaps are thus avoided, and a smooth transfer of the inked image is assured.

Figure 6:
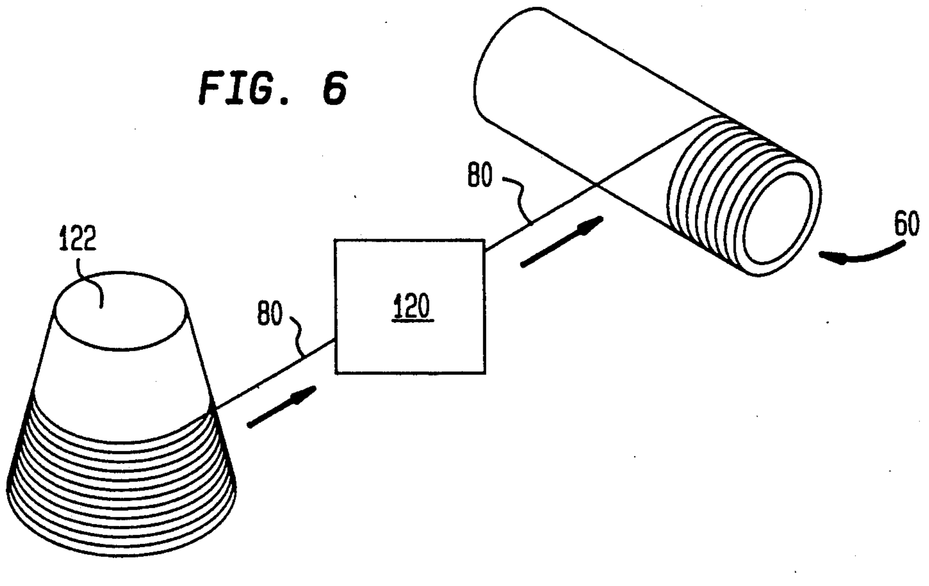
FIG. 6 is a schematic view illustrating a method of constructing a tubular printing blanket in accordance with the present invention.

The present invention further contemplates methods of manufacturing a tubular printing blanket. In a preferred method of manufacturing the tubular printing blanket 14 as shown in FIG. 3, the primer coat 71 of Chemlok 205 is applied on the cleaned outer surface of the backing layer 60, and is aged for about 30 minutes. The second primer coat 72 of Chemlok 220 is then applied and aged for about 30 minutes. The first compressible layer 62 is then applied over the primed backing layer 60 by encapsulating the thread 80 in the compressible composite rubber cement, and by winding the encapsulated thread 80 in a helix around the primed backing layer 60. As shown schematically in FIG. 6, the thread 80 is encapsulated in the rubber cement by drawing the thread 80 through the rubber cement in a container 120. The thread 80 is drawn through the rubber cement in the container 120 as it is wound onto the backing layer 60 from a spool 122. An additional quantity of the rubber cement is then applied over the wound thread 80 as needed to define an additional thickness of the first compressible layer 62 in the region 126 shown in FIG. 3. The first compressible layer 62 is then aged for two hours and oven dried for four hours at 140° F. The second compressible layer 64 is formed in the same manner. If desired, additional windings of compressible thread can be included in either or both of the compressible layers 62 and 64.

The inextensible layer 66 shown in FIG. 3 is formed by similarly encapsulating the thread 102 in an elastomeric material without microspheres, and by winding the encapsulated thread 102 in a helix around the second compressible layers 62 and 64. The encapsulated thread 102 is preferably impregnated thoroughly with the elastomeric material, and is wound in tension so as to apply a radially compressive preload to the compressible layers 62 and 64. The inextensible layer 66 is then air dried for fifteen minutes.

Next, a sheet of uncured print rubber 0.040 inches thick is wrapped over the outside of the incompressible layer 66 to form the printing layer 68. The resulting structure is wrapped with a 2.25 inch nylon tape (not shown), and is oven cured for four hours at 200° F. and four hours at 292° F. The adjoining edges of the wrapped sheet are skived, and become bonded together when cured so that the finished printing layer 68 has no axially extending seam. The overlying bodies 74, 90 and 100 of elastomeric material also become bonded together when cured. The layers 62–68 can then be identified individually by their different components as shown in FIG. 4, but are not separate from each other. Accordingly, the elastomeric materials of the layers 62–68 define a single, continuous seamless tubular body of elastomeric material when cured. Since the inextensible layer 66 is also compressible, the layers 62–66 effectively define a composite compressible layer having a lower portion containing compressible thread and microspheres, and an upper portion containing compressible thread without microspheres. After curing, the tape is removed and the printing layer 68 is ground to a thickness of about 0.013 to 0.020 inches, and is finished to define the smooth continuous outer printing surface 110.

Figure 7:
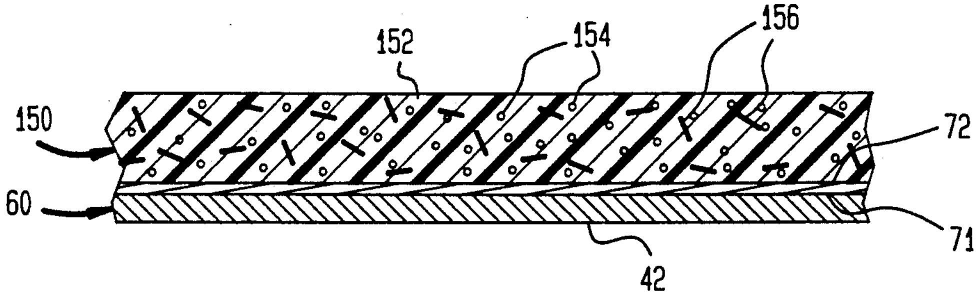
FIG. 7 is a partial sectional view of a tubular printing blanket in accordance with an alternate embodiment of the present invention.

FIG. 7 shows an alternate embodiment of a compressible layer for a tubular printing blanket in accordance with the present invention. The compressible layer 150 shown in FIG. 7 comprises a seamless tubular body 152 of elastomeric material, microspheres 154, and ground cotton fibers 156. The microspheres 154 and the ground cotton fibers 156 are uniformly distributed within the tubular body 152 so as to impart compressibility to the layer 150. As with the threads 80 and 94 in the compressible layers 62 and 64 described above, the ground cotton fibers 156 have a relatively low tendency to become overheated when repeatedly compressed at a nip between a blanket cylinder and a plate cylinder.

Figure 8A:
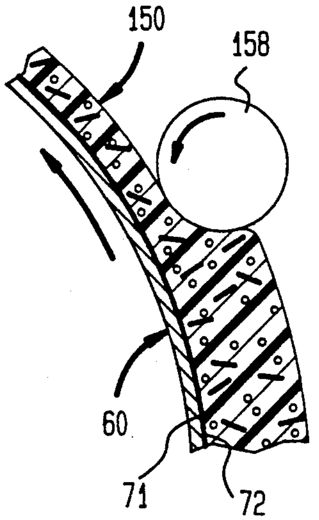
FIGS. 8A through 8C are schematic views showing methods of constructing the tubular printing blanket of FIG. 7.
Figure 8B:
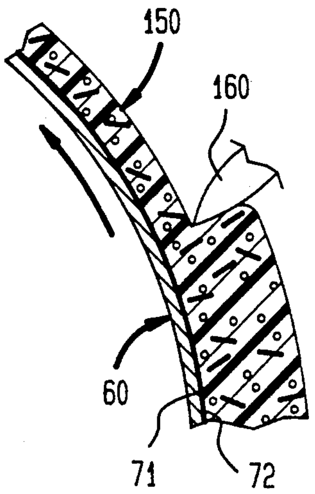
Figure 8C:
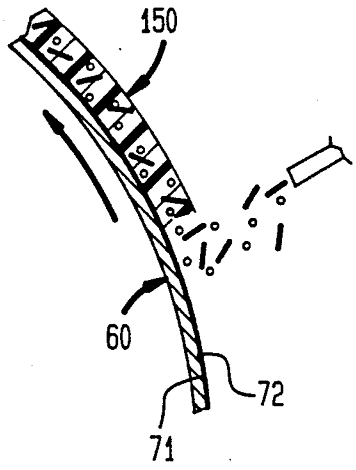

FIGS. 8A and 8B schematically illustrate methods of applying the compressible layer 150 to a measured thickness over the primed backing layer 60 by metering a compressible composite rubber cement with a doctor roll 158 and with a doctor blade 160, respectively. FIG. 8C schematically illustrates a method of applying the compressible layer 150 by spraying a compressible composite rubber cement to a measured thickness over the primed backing layer 60. The printing layer 68 could alternately be formed by metering or spraying the rubber material, and/or the compressible layers 62, 64, and 150 could alternately be formed by wrapping calendared sheets with skived edges that do not define axially extending seams when cured.

FIGS. 9A and 9B schematically illustrate another alternate embodiment of a compressible layer for a tubular printing blanket in accordance with the invention. As shown in FIG. 9A, a compressible layer 170 is formed as a seamless cylindrical casting. The compressible layer 170 is formed of the same materials as the compressible layer 150 described above, and has an inside diameter not greater than the outside diameter of the backing layer 60. When stretched radially as shown in FIG. 9B, the compressible layer 170 is movable telescopically over the backing layer 60. The compressible layer 170 is then permitted to contract so as to be installed in a condition of radial and circumferential tension.

FIG. 10 schematically illustrates an alternate embodiment of a circumferentially inextensible sublayer of a tubular printing blanket in accordance with the invention. As shown in FIG. 10, the longitudinally inextensible thread 102 is woven to form a tube 200 which is movable telescopically over the compressible layers 62 and 64 shown in FIG. 3. The pattern of the woven thread 102 does not permit axial or radial expansion of the tube 200. In a preferred method of forming a tubular printing blanket including the tube 200, a quantity of elastomeric material is applied to a shallow depth over the second compressible layer 64, and the tube 200 is then moved telescopically over the elastomeric material and the second compressible layer 64. Additional elastomeric material is then applied as needed over the tube 200 so as to encapsulate and saturate the thread 102 and to provide the desired thickness of the completed inextensible layer. In this embodiment of the invention, the thread 102 can be shrunk with the application of heat. The shrunken tube 200 would be in circumferential and axial tension, and would apply a radially compressive preload to the underlying compressible layers 62 and 64.

FIGS. 11A and 11B schematically illustrate another alternate embodiment of a circumferentially inextensible sublayer of a tubular printing blanket in accordance with the invention. As shown in FIG. 11A, the longitudinally inextensible thread 102 is knitted to form a tube 210 which is movable telescopically over the compressible layers 62 and 64 shown in FIG. 3. The pattern of the knitted thread 102 permits the tube 210 to be axially elongated with a resultant reduction in its diameter, as indicated in FIG. 11B. In a preferred method of constructing a tubular printing blanket including the tube 210, an elastomeric material is applied to a shallow depth over the second compressible layer 64, and the tube 210 is moved telescopically over the elastomeric material and the compressible layer 64. The tube 210 is then elongated axially so as to reduce its diameter. The elongated tube 210 is in circumferential and axial tension, and thereby applies a radially compressive preload to the underlying compressible layers 62 and 64. Additional elastomeric material is applied over the elongated tube 210 so as to impregnate the thread 102 and to complete the inextensible layer to a desired thickness. The elastomeric material, when cured, defines a seamless tubular body encapsulating the elongated tube 210.

FIG. 12 is a sectional view of another alternate embodiment of a circumferentially inextensible sublayer of a tubular printing blanket in accordance with the invention. As shown in FIG. 12, a continuous piece of plastic film 230 extends in a spiral through the elastomeric material 232 of an inextensible layer and around a compressible layer 234. The film 230 preferably has a width approximately equal to the length of the tubular printing blanket, and a thickness of only 0.001 inches so that the narrow seam defined by the 0.001 inch wide edge 236 of the uppermost layer thereof will not disrupt the smooth, continuous cylindrical contour of an overlying printing layer.

Figure 13:
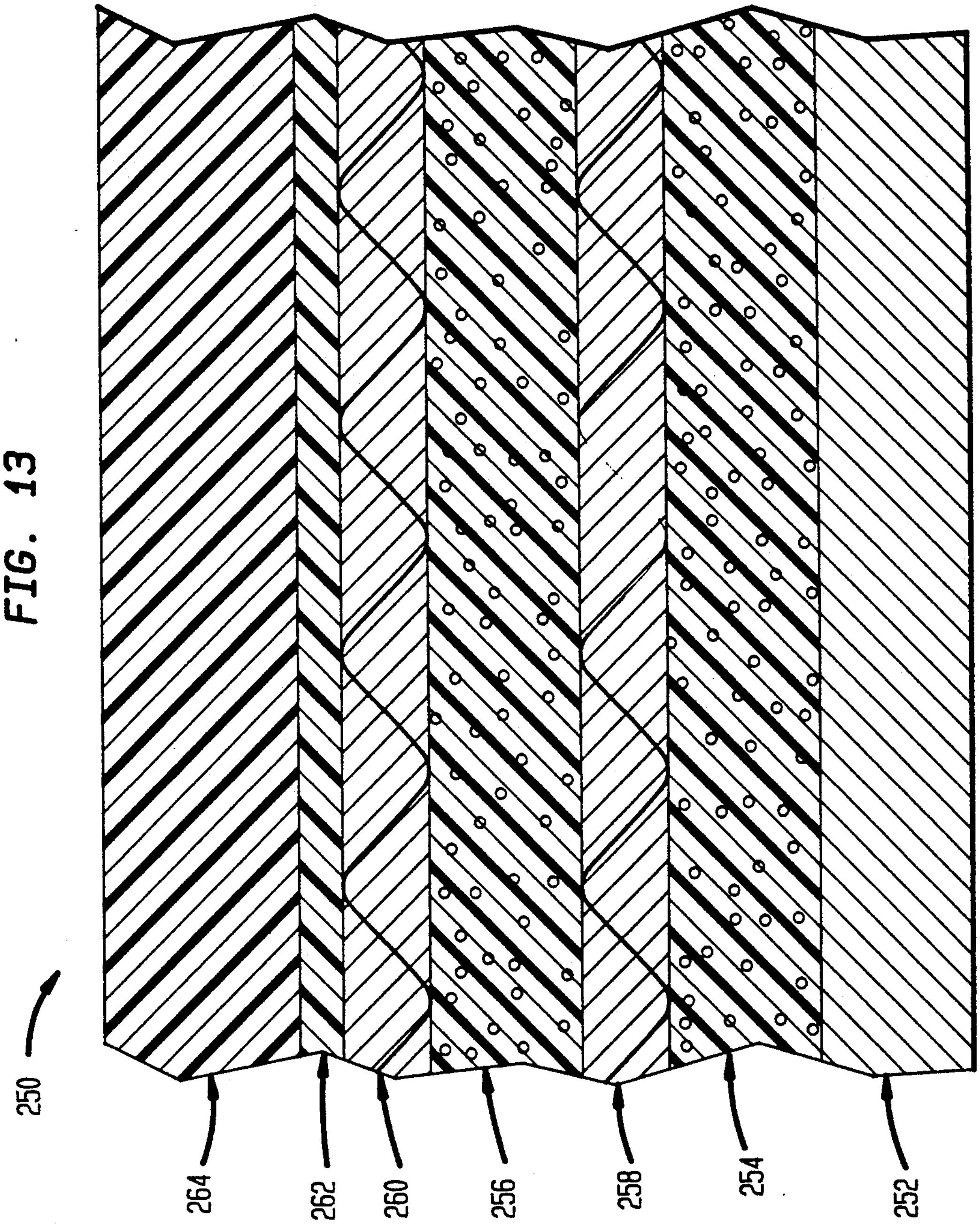
FIG. 13 is a partial sectional view of still another alternate embodiment of the invention.

FIG. 13 is a partial sectional view of another alternate embodiment of the invention. As shown in FIG. 13, a tubular printing blanket 250 comprises a relatively rigid backing layer 252, a pair of seamless tubular rubber cement layers 254 and 256 including microspheres, and a pair of tubular compressible fabric layers 258 and 260. The compressible fabric layers 258 and 260 are preferably formed as woven or knitted tubes as shown in FIGS. 10, 11A and 11B. The upper compressible fabric layer 260 is most preferably installed as a circumferentially inextensible tube so as to define an inextensible layer of the tubular printing blanket 250. An intermediate layer 262 of plain rubber cement helps to bond a tubular printing layer 264 to the upper compressible fabric layer 260.

From the above description of the invention, those skilled in the art will perceive improvements, changes and modifications. Such improvements, changes and modifications within the skill of the art are intended to be covered by the appended claims.

Having described the invention, the following is claimed:

1. A method of manufacturing a tubular printing blanket for use on a blanket cylinder in an offset printing press, said method comprising steps of:

forming a first layer of said tubular printing blanket by embedding compressible microspheres in a first batch of elastomeric material to form a compressible composite material, and applying said compressible composite material in a seamless tubular form over a cylindrical sleeve;

forming a second layer of said tubular printing blanket by applying a second batch of elastomeric material in a seamless tubular form over said first layer, and embedding a circumferentially inextensible material in said second batch of elastomeric material; and forming a printing layer of said tubular printing blanket by applying a third batch of elastomeric material in a seamless tubular form over said second layer, and forming a continuous cylindrical printing surface on said printing layer.

2. A method of manufacturing a tubular printing blanket for use on a blanket cylinder in an offset printing press, said method comprising steps of:

forming a first layer of said tubular printing blanket by embedding a compressible means in a batch of a first elastomeric material to form a compressible composite material, and applying said compressible composite material in a circumferentially endless tubular form over a cylindrical sleeve to form a gapless and seamless cylindrical layer of said compressible composite material;

forming a second layer of said tubular printing blanket by applying a batch of a second elastomeric material in a circumferentially endless tubular form over said first layer to form a gapless and seamless cylindrical layer of said second elastomeric material, and embedding a circumferentially inextensible material in said circumferentially endless tubular body of said second elastomeric material; and forming a printing layer of said tubular printing blanket by applying a batch of a third elastomeric material in a circumferentially endless tubular form over said second layer, and forming a continuous gapless cylindrical printing surface on said printing layer.

3. A method as defined in claim 2 wherein said compressible composite material is formed by embedding a compressible fabric material and compressible microspheres in said batch of said first elastomeric material.

4. A method as defined in claim 3 wherein said compressible composite material is formed by coating a thread of compressible fabric with a mixture of said batch of said first elastomeric material and said compressible microspheres, and is applied in a circumferentially endless tubular form over said sleeve by winding said coated thread in a helix around said sleeve.

5. A method as defined in claim 3 wherein said compressible composite material is formed by dispersing compressible fabric fibers in said batch of said first elastomeric material, and is applied to a measured thickness over said sleeve.

6. A method as defined in claim 5 wherein said compressible composite material is applied to a measured thickness over said sleeve with a doctor blade.

7. A method as defined in claim 5 wherein said compressible composite material is applied to a measured thickness over said sleeve with a doctor roll.

8. A method as defined in claim 2 wherein said second layer is formed by coating a longitudinally inextensible thread with said batch of said second elastomeric material, and winding said coated thread in a helix around said first layer.

9. A method as defined in claim 8 wherein adjacent circumferential sections of said thread are wound so as to extend in directions substantially perpendicular to the axis of said sleeve.

10. A method as described in claim 2 wherein said second layer is formed by telescopically moving a knitted tube of longitudinally inextensible thread over said first layer, and elongated said knitted tube axially to reduce the diameter thereof and to apply a radially compressive preload to said first layer.

11. A method as defined in claim 2 wherein said second layer is formed by telescopically moving a woven tube of longitudinally inextensible thread over said first layer, and shrinking said thread to reduce the diameter of said woven tube and to apply a radially compressive preload to said first layer.

* * * * *